UNITED STATES PATENT OFFICE.

FRANCIS M. IRONMONGER, OF BROOKLYN, NEW YORK.

PROCESS OF BLEACHING EDIBLE NUTS.

SPECIFICATION forming part of Letters Patent No. 361,700, dated April 26, 1887.

Application filed December 28, 1886. Serial No. 222,801. (No specimens.)

*To all whom it may concern:*

Be it known that I, FRANCIS M. IRONMONGER, a citizen of the United States, residing at No. 103 Cambridge Place, Brooklyn, in the county of Kings and State of New York, have invented certain new and useful Improvements in Processes of Bleaching Edible Nuts; and I declare the following to be a full, clear, and exact description of the invention, such as will enable others skilled in the art to which it appertains to make and use the same.

This invention is an improvement on the process covered by my Patent No. 126,550, dated May 7, 1872, and has relation to the cleaning and improving of the shells of edible nuts; and it consists in the following described process:

I make a solution by dissolving protochloride of tin or stannous chloride, commercially known as "tin salt" or "tin crystals," in muriatic acid. As this solution is too strong for practical use, I dilute it with about ten parts of water to one part of the salt. Immerse the nuts in the solution and allow them to remain long enough to change the color satisfactorily, say, five to thirty minutes, according to the strength of the solution and the nature of the shells operated on. Then separate the nuts from the solution, after which wash them well in clear water to remove the solution that will be left on the shells. Then separate the nuts from the water and dry them by exposure or artificial heat, after which they are ready to be packed.

As the salt is of variable quality, and the shells of some nuts require longer and stronger treatment than others, it is impossible to give precise proportions in diluting the solution with water. The proportions herein mentioned will be found to afford the greatest satisfaction in the process; but if more water be used than the proportion stated the same result will be obtained as to brightening the shells, but will require longer time.

This process is designed to clean and improve edible nuts in order to render them more attractive, and thereby more valuable, as nuts of good quality and dark shells are less sought after than those having clean and light shells.

My process renders the nuts clean, bright, and attractive in color and makes them as marketable as those having naturally bright shells.

Having thus described my invention, what I claim as new and useful, and desire to secure by Letters Patent, is—

The process of bleaching and improving edible nuts, herein described, consisting in subjecting the nuts to a bath of a solution of protochloride of tin, commercially known as "tin salt" or "tin crystals," dissolved in muriatic acid, substantially as set forth, and then drying the nuts.

FRANCIS M. IRONMONGER.

Witnesses:
CHAS. I. MALONE,
NEWBOULD B. SEATON.